United States Patent [19]

Kubota

[11] Patent Number: 5,056,090
[45] Date of Patent: Oct. 8, 1991

[54] DATA TRANSMISSION APPARATUS TO BE CONNECTED TO MULTIPLEXED TRANSMISSION LINE

[75] Inventor: Soichi Kubota, Tama, Japan

[73] Assignee: Kabushiki Kaisha Toshiba, Kawasaki, Japan

[21] Appl. No.: 350,690

[22] Filed: May 9, 1989

[30] Foreign Application Priority Data

May 10, 1988 [JP] Japan .................. 63-113248

[51] Int. Cl.$^5$ ............................................ G06F 11/00
[52] U.S. Cl. ..................................... 371/8.2; 371/11.2; 370/16
[58] Field of Search ............... 371/68.2, 68.3, 8.2, 371/11.2, 11.3, 15.1, 22.1; 379/27, 29, 22, 26; 370/16

[56] References Cited

U.S. PATENT DOCUMENTS

| | | | |
|---|---|---|---|
| 4,042,794 | 8/1977 | Lima et al. | 371/20.4 |
| 4,195,769 | 4/1980 | Elias et al. | 371/15.1 |
| 4,451,916 | 5/1984 | Casper et al. | 371/8.2 |
| 4,680,776 | 7/1987 | Ikeuchi et al. | 371/8.2 |
| 4,881,230 | 11/1989 | Clark et al. | 370/16 |

Primary Examiner—Jerry Smith
Assistant Examiner—Ly V. Hua
Attorney, Agent, or Firm—Oblon, Spivak, McClelland, Maier & Neustadt

[57] ABSTRACT

A transmission apparatus comprises a first data check circuit for making an error check with respect to the data transmitted through each transmission channel of a multiplexed transmission line, a selection circuit for selecting one transmission channel of the multiplexed line and outputting the data transmitted through the selected transmitting channel, a second data check circuit for making an error check with respect to the data output from the selection circuit, and a data processing section for determining the cause of an error on the basis of results of the error checks made by the first and second data check circuits. If an error is detected by the second data check circuit without being detected by the first data check circuit, the data processing section determines that the error has been caused as a result of the switching operation performed by the selection circuit.

19 Claims, 3 Drawing Sheets

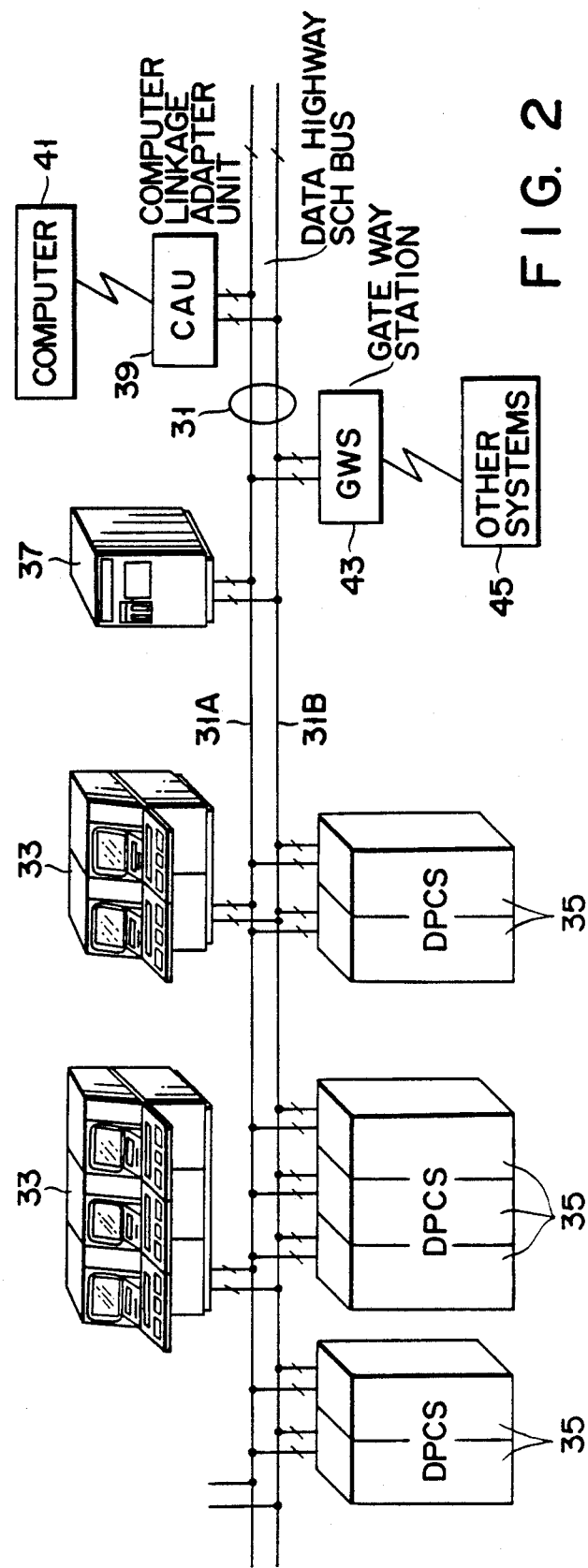
F I G. 2

DATA TRANSMISSION APPARATUS TO BE CONNECTED TO MULTIPLEXED TRANSMISSION LINE

SUMMARY OF THE INVENTION

1. Field of the Invention

The present invention relates to a data transmission apparatus which is to be connected to a multiplexed transmission line and which selects one channel of the transmission line to receive data therefrom, and more particularly to improvement of the data check function of the data transmission apparatus.

2. Description of the Related Art

FIG. 1 shows the configuration of a prior art data transmission apparatus. Referring to FIG. 1, transmission lines 1 and 2 are connected to a duplex bus, and selection circuit 3 is connected to both transmission lines 1 and 2. Selection circuit 3 selects one of transmission lines 1 and 2 to receive data therefrom and sends the data to both data check circuit 4 and CPU 5. Data check circuit 4 checks whether nor not the data includes an error, and supplies signal E representing results of the check to CPU 5.

CPU 5 controls selection circuit 3 on the basis of signal F, thereby causing selection circuit 3 to select one transmission line. From the selected transmission line, CPU 5 receives data through selection circuit 3 and operates on the basis of the received data.

In the above data transmission apparatus, CPU 5 can detect the occurrence of a transmission error on the basis of signal E, but cannot determine the location of the transmission error or the cause of the transmission error. For instance, it may happen that selection circuit 3 will perform signal line selection when CPU 5 is receiving data from one transmission lines. In this case, the data received by CPU 5 is made to include a null-data portion and therefore becomes error data. However, CPU 5 cannot determine whether this transmission error is due to the signal line selection performed by selection circuit 3.

SUMMARY OF THE INVENTION

The present invention has been developed in consideration of the above circumstances, and the first object of the invention is to provide a data transmission apparatus which is to be connected to a multiplexed transmission line through a selection circuit and which can determine the cause of an error, particularly whether or not the error is caused as a result of transmission channel selection performed during data reception.

The second object of the invention is to provide a data transmission system which can detect the location of a transmission error.

To achieve the first object, the present invention provides a data transmission apparatus, comprising:
first data check means for making an error check with respect to the data transmitted through each channel of a multiplexed data transmission line;
selection means, connected to each channel of the data transmission line, for selecting one of the channels and for outputting the data transmitted through the selected channel; and
second data check means for making an error check with respect to the data output from the selection means.

Since the data transmission apparatus comprises the first and second data check means mentioned above, the cause of a transmission error can be determined on the basis of the results of the checks made by the data check means.

To achieve the second object, the present invention provides a data transmission apparatus, comprising:
multiplexed data transmission means, including a plurality of transmission channels, for transmitting the same data through the channels at a normal time;
first data check means for making an error check with respect to the data transmitted through the transmission channels;
selection means, connected to the data transmission means, for selecting one of the transmission channels to receive the data transmitted through the selected transmission channel and for outputting the received data;
second check means, connected to the selection means to receive the data output therefrom, for making an error check with respect to the data output from the selection means; and
determination means, connected to the first and second data check means, for determining that an error is caused as a result of transmission line selection performed during data reception, if the error is detected by the second data check means without being detected by the first data check means.

Since the data transmission system comprises the determination means mentioned above, it is possible to detect an error which may be caused as a result of transmission line selection performed during data reception.

BRIEF DESCRIPTION OF THE DRAWINGS

FIG. 2 is a block circuit diagram showing the configuration of a data transmission system according to the first embodiment of the invention;

DETAILED DESCRIPTION OF THE PREFERRED EMBODIMENTS

Figure 1:
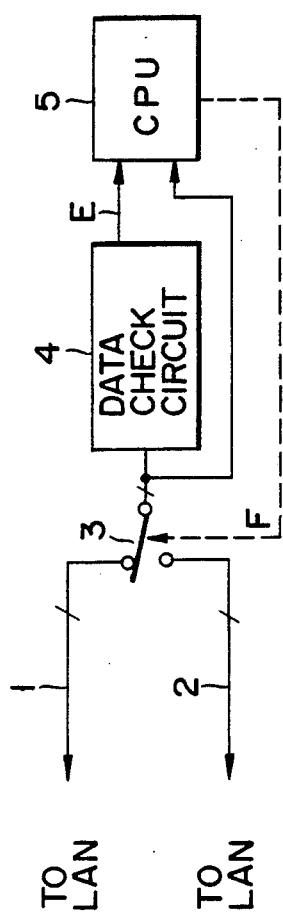
FIG. 1 is a block circuit diagram showing the configuration of a conventional data transmission apparatus.

A data transmission apparatus according to the first embodiment of the invention will now be described in detail with reference to the accompanying drawings, referring to a LAN (i.e., a local area network) or data transmission system incorporating the data transmission apparatus.

First of all, the entire configuration of the LAN will be described, with reference to FIG. 2.

As is shown in FIG. 2, the LAN comprises data highway 31 (i.e., a transmission line, or a bus); and a plurality of data transmission apparatuses (i.e., transmitting, receiving and controlling apparatuses) are connected to data highway 31. Data highway 31 is a duplex highway including first and second data highways 31A and 31B. In this embodiment, it is assumed that first data highway 31A is used at a normal time and second data highway 31B is used in the case of emergency. At the normal time, the same data is transmitted through first and second data highways 31A and 31B. The data transmitted through data highways 31A and 31B is exemplified by address data, control data, process data, etc.

Process console 33 is connected to data highways 31A and 31B. Process console 33 controls the operation of the entire system in a centralized fashion. It also functions as an interface between the system and an operator. A plurality of process control stations 35, an example of one of which is a distributed process control station (DPCS), are connected to data highways 31A and 31B. Each process control station 35 controls a process on the basis of the commands supplied thereto from process console 33 and of the program stored therein. Data base 37 is also connected to data highway 31. Computer 41 is connected to data highway 31 through computer application adapter unit (CAV) 39. Other systems are also connected to data highway 31 through gate way station (GWS) 43.

Figure 3:
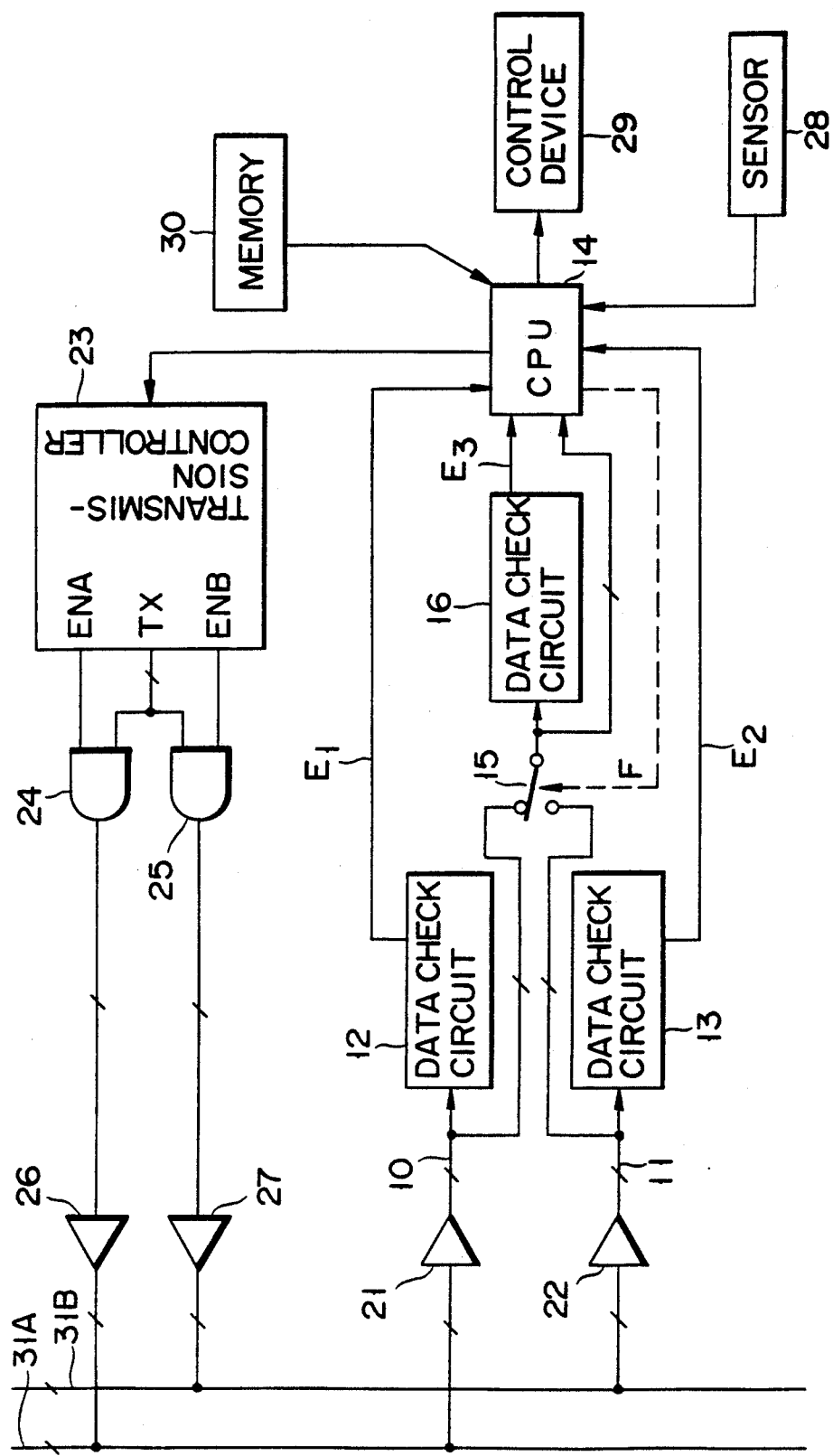
FIG. 3 is a block circuit diagram showing the configuration of the process controller shown in FIG. 2.

The configuration of a data transmission apparatus connected to data highway 31 will now explained, taking distributed process control station (hereinafter referred to as "DPCS") 35 as an example. Each DPCS comprises such structural elements as are shown in FIG. 3. Specifically, first transmission line 10 is connected to first highway 31A through input buffer 21, and is also connected to first data check circuit 12 and to one of the two input terminals of selection circuit 15. Similarly, second transmission line 11 is connected to second highway 31B through input buffer 22, and is also connected to second data check circuit 13 and to the other input terminal of selection circuit 15. The output terminal of selection circuit 15 is connected to CPU 14 and to the input terminal of third data check circuit 16. The CPU 14 carries out multiple functions, as will be set forth below. Included in these functions are a determining function and a data processing function as well as a process-controlling function.

Error detection signals E1, E2 and E3, output from first, second, and third data check circuits 12, 13 and 16, respectively, are supplied to the respective interrupt terminals of CPU 14. CPU 14 supplies selection control signal F to the control terminal of selection circuit 15. In a normal condition, CPU 14 controls control signal F such that selection circuit 15 selects first data highway 31A, i.e., first transmission line 10.

The data output from CPU 14 is supplied to transmission controller 23. This transmission controller outputs transmission data from its transmission text (data) terminal TX. The transmission data is supplied to one of the two input terminals of first and second AND gates 24 and 25. Transmission enable signals ENA and ENB are supplied to the other input terminals of first and second AND gates 24 and 25, respectively. The output data of AND gate 24 is supplied to first data highway 31A through output buffer 26, and the output data of AND gate 25 is supplied to second data highway 31B through output buffer 27.

Sensor (e.g., a pressure sensor, a temperature sensor, a flow rate sensor, or the like) 28 for detecting the condition of an object under control is connected to CPU 14. Various control devices 29 for controlling process variables (e.g., an electromagnetic valve, a heater, etc.) are also connected to CPU 14. Memory 30, which stores a program used for controlling CPU 14 and data used for process control, is connected to CPU 14 through an internal bus.

First, second and third data check circuits 12, 13 and 16 can be formed by a known configuration. Examples of the checks which the data check circuits make with respect to reception data are: a CRC error check (cyclic redundancy check), a parity error check, a time-out check, an alignment error check, and a reception size check. The time out check is made for detecting whether or not reception data is interrupted for more than a predetermined time, the alignment error check is made for detecting whether or not the reception data has a predetermined length, and the reception size check is made for detecting whether or not the size of reception data (i.e., the number of bits of each data frame, and the number of data frames) is appropriate. These data checks are known. It should be noted that selection circuit 15 may be constituted by bus selector.

The operation of the above system will no be described.

The data transmitted through data highway 31 is supplied to first and second data check circuits 12 and 13 through buffers 21 and 22. First and second data check circuits 12 and 13 make a predetermined error check with respect to the data. If data check circuits 12 and 13 detect an error, they supply signals E1 and E2 to CPU 14.

Third data check circuit 16 checks whether or not the data supplied through selection circuit 15 includes an error. If an error is detected, third data check circuit 16 supplies signal E3 to CPU 14.

CPU 14 checks the destination address of the data transmitted through data highway 31. If the destination address corresponds to an address of CPU 14, CPU 14 makes the error check shown in FIG. 4 on the basis of signals E1, E2 and E3. The error check shown in FIG. 4 will be explained later.

On the basis of the reception data, a series of process data stored in memory 30, and process data supplied from sensor 28, CPU 14 supplies control data, a target value, etc. to control device 29.

On the basis of control signal F, CPU 14 controls the transmission line selection performed by selection circuit 15. At a normal time, CPU 14 causes selection circuit 15 to select transmission line 10, as is shown in FIG. 3. However, if CPU 14 determines, after making the error check mentioned later, that a trouble occurs in the system of first data highway 31A, or if CPU 14 receives a particular command from process console 33, it causes selection circuit 15 to select transmission line 11. Further, if CPU 14 determines that the trouble occurring in the system of first data highway 31A has recovered, or if CPU 14 receives a particular command from process console 33, it causes selection circuit 15 to select transmission line 10 again.

Figure 4:
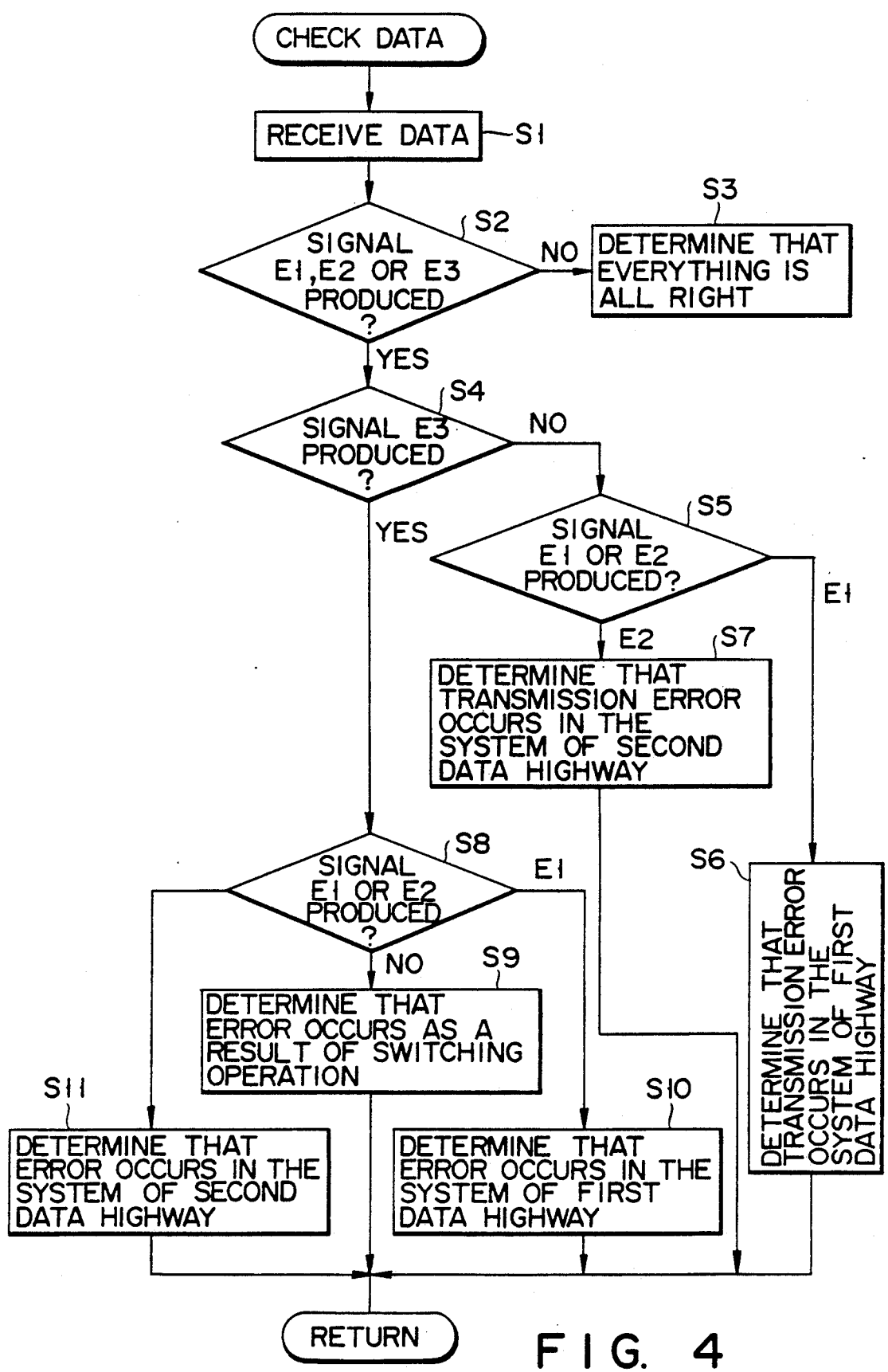
FIG. 4 is a flow chart for illustrating how the CPU shown in FIG. 3 operates.

The error check made by CPU 14 will now be described, with reference to the flow chart shown in FIG. 4.

First of all, CPU 14 receives data and checks the destination address of the data (Step S1). Then, CPU 14 checks whether or not one of error detection signals E1, E2 and E3 has been produced (Step S2). If none of these signals are produced, CPU 14 determines that its reception data includes no error, and stores the data in either its internal memory or memory 30. On the basis of the reception data, CPU 14 continues a control operation (Step S3).

If it is determined in Step S2 that one error detection signal has been produced, CPU 14 checks whether or not the produced signal is error detection signal E3 (Step S4). If the produced signal is not error detection signal E3, then CPU 14 checks whether the signal is error detection signal E1 or error detection signal E2 (Step S5). If it is determined that signal E1 has been produced, CPU 14 determines that a transmission error occurs in the system of the normally-used system (i.e., the system of first data highway 31A). More specifically, CPU 14 determines that the data transmitted through first data highway 31A includes an error, or that a trouble occurs in first data highway 31A (Step S6).

If it is determined in Step S5 that signal E2 has been produced, CPU 14 determines that a transmission error occurs in the system of second data highway 31B (Step S7).

If it is determined in Step S4 that signal E3 has been produced, CPU 14 checks whether signal E1 or signal E2 is also produced (Step S8). If neither signal E1 nor signal E2 is produced, CPU 14 determines that an error has occurred as a result of the switching operation performed by selection circuit 15 (Step S9). For instance, in the case where signal E3 alone is produced (i.e., neither signal E1 nor signal E2 is produced) during the selection of transmission line 10, CPU 14 determines that an error is included for some reason or other as a result of the switching from transmission line 10 to transmission line 11.

If, in step S8, signal E1 is produced, CPU 14 determines that an transmission error occurs in the system of first data highway 31A (Step S10).

If it is determined that the reception data includes an error, CPU 14 requests the transmitting device of the sender that the data be sent once again (the re-transmitting operation of the data will be explained later). Alternatively, CPU 14 stores the data regarding the occurrence of the error in a memory and then request the transmitting device of the sender in a transmission cycle that the data be re-transmitted.

As long as transmission line 10 is selected, the execution of Step S6 should not happen. Likewise, as long as transmission line 11 is selected, the execution of Step S7 should not happen. However, if Step S6 is executed during the selection of transmission line 10, CPU 14 determines that either first error check circuit 12 or third error check circuit 16 is broken or operates erroneously. Likewise, if Step S7 is executed during the selection of transmission line 11, CPU 14 determines that either second error check circuit 13 or third error checking circuit 16 is broken or operates erroneously. In such cases, CPU 14 requests the transmitting device of the sender that data be re-transmitted.

In the above fashion, CPU 14 determines whether an error is caused in the system of the first data highway or in the system of the second data highway, or whether it is caused as a result of the transmission line selection made by selection circuit 13. Thus, CPU 14 can checks the source of the error (i.e., the location at which the error occurs).

CPU 14 prepares a statistic list of the locations of errors and stores it in memory 30. If a data error occurs more than a predetermined reference number of times in the system of one data highway, then CPU 14 informs process console 33 of the occurrence of the errors and of the possibility of the system in question being broken. Simultaneously, CPU 14 controls selection circuit 15 to select a data highway free from troubles. For instance, if a data error successively occurs five times in the system of the first data highway, CPU 14 informs process console 33 of the occurrence of the errors and controls selection circuit 15 to select a normal data highway, i.e., data highway 31B.

CPU 14 transmits data in the following manner. First, it supplies data to transmission controller 23. After rendering both enable signals ENA and ENB in the active level, CPU 14 outputs the data in the form of text data. As a result, the data is transmitted to first data highway 31A via AND gate 24 and output buffer 26, and to second data highway 31B via AND gate 25 and output buffer 27.

Process console 33 and some other devices also have a data checking function similar to that of DPCS 35 shown in FIG. 3. However, all devices connected to data highway 31 need not have the data checking configuration shown in FIG. 3. It will suffice if some of the devices have the data checking function.

The above embodiment was described, referring to the case where the data highway is a duplex line. However, the present invention is not limited to this, and can be applied to a data transmitting system employing a triplex line or other multiplexed lines.

The above embodiment was described, referring to the case where the same data is transmitted through each channel of a multiplexed line. However, the present invention is not limited to this, and can be applied to a data transmission apparatus wherein different pieces of data are transmitted through the respective channels of a multiplexed line and which fetches one of the pieces of data by means of a selection circuit.

With the configuration mentioned above, the CPU can detect the source of an error and therefore determine the cause of the error. In particular, the CPU can detect the occurrence of an error arising from the signal line selection performed by the selection circuit. Therefore, the present invention is particularly advantageous when used as a device which selects one channel of a multiplexed bus (namely, a duplex bus, a triplex bus, etc.) to receive data from the selected channel, i.e., a device which may encounter an error arising from the channel switching performed by the selection circuit.

What is claimed is:

1. A data transmission system, comprising:
   multiplexed data transmission means, including a plurality of transmission channels, for transmitting the same data through the plurality of transmission channels at a normal time;
   first data check means, connected to said data transmission means, for making an error check with respect to data transmitted through the transmission channels;
   selection means, connected to said data transmission means, for selecting one of the transmission channels to receive data transmitted through the selected transmission channel and for outputting the received data;
   second data check means, connected to said selection means to receive data output therefrom, for making an error check with respect to the data output from said selection means; and
   determination means, connected to said first and second data check means, for determining that an error is caused as a result of switching of transmission line selection performed by said selection means during data reception, if the error is detected by said second data check means without being detected by said first data check means.

2. A data transmission system according to claim 1, wherein said determination means includes means for receiving the data output from said selection means and performing a predetermined control operation on the basis of reception data which is determined to include no error.

3. A data transmission system according to claim 1, wherein said determination means includes a central processing unit which performs a control operation on the basis of a predetermined program.

4. A data transmission apparatus according to claim 1, wherein said determination means prepares a statistic list of locations of errors and, when a data error is caused more than a predetermined reference number of times in a data transmission line, controls said selection means to select a normal data transmission line.

5. A data transmission system, comprising:
   a multiplexed data transmission line including a plurality of transmission channels;
   a process console connected to said data transmission line; and
   a process controller connected to said data transmission line;
   at least one of said process console and said process controller including:
   first data check means for making an error check with respect to data transmitted through each of the transmission channels;
   selection means, connected to the data transmission channels, for selecting one of the transmission channels and outputting data transmitted through the selected transmission channel;
   second data check means for making an error check with respect to the data output from said selection means; and
   data processing means connected to said first data check means, said second data check means, said transmission channels, and said selection means, said data processing means being for determining a cause of an error on the basis of results of the error checks made by said first and second data check means when received data includes an error, for performing data processings on the basis of the data output from said selection means, and for outputting the processed data to the transmission channels.

6. A data transmission system according to claim 5, wherein said determination means causes said selection means to select a normal transmission channel when said determination means determines, on the basis of signals output from said first and second data check means, that something is wrong with one transmission channel.

7. A data transmission system according to claim 5, wherein:
   said multiplexed data transmission line includes first and second transmission channels;
   said first data check means includes an error check means connected to the first transmission channel, and another error check means connected to the second transmission channel; and
   said selection means is connected to the first and second transmission channels, selects one of the first and second transmission channels, and outputs data transmitted through the selected transmission channel.

8. A data transmission system according to claim 5, wherein said first and second data check means execute at least one of: a CRC check, a parity check, a data size check, a time-out check, and an alignment error check.

9. A data transmission system according to claim 5, wherein said data processing means determines that an error is caused as a result of a switching operation performed by said selection means if the error is detected by said second data check means without being detected by said first data check means.

10. A data transmission system according to claim 9, wherein said data processing means prepares a statistic list of locations of errors and, when a data error is caused more than a predetermined reference number of times in a data transmission line, controls said selection means to select a normal data transmission line.

11. A data transmission system according to claim 5, wherein said data processing means means receives the data output from said selection means and performs a predetermined control operation on the basis of reception data which is determined to include no error.

12. A data transmission system according to claim 5, wherein said data processing means outputs the same data to the transmission channels.

13. A data transmission system according to claim 5, wherein said data processing means includes a central processing unit which performs a control operation ion the basis of a predetermined program.

14. A data transmission apparatus, comprising:
   first data check means for making an error check with respect to data transmitted through each of channels of a multiplexed data transmission line;
   selection means, connected to each channel of said data transmission line, for selecting one of the channels and for outputting data transmitted through the selected channel;
   second data check means for making an error check with respect to the data output from said selection means;
   data processing means, which receives the data output from said selection means, for performing a predetermined data processing operation; and
   wherein said data processing means determines a cause of an error on the basis of results of the error checks made by said first and second data check means.

15. A data transmission apparatus according to claim 14, wherein said data processing means determines that an error is caused as a result of a transmission channel switching operation performed by said selection means if the error is detected by said second data check means without being detected by said first data check means.

16. A data transmission apparatus according to claim 15, wherein said data processing means prepares a statistic list of locations of errors and, when a data error is caused more than a predetermined reference number of times in a data transmission line, controls said selection means to select a normal data transmission line.

17. A data transmission apparatus according to claim 14, wherein said data processing means causes said selection means to select a normal transmission channel when said data processing means determines, on the basis of signals output from said first and second data check means, that something is wrong with one transmission channel.

18. A data transmission apparatus according to claim 14, wherein:
   said multiplexed data transmission line includes first and second transmission channels;
   said first data check means includes an error check means connected to the first transmission channel, and another error check means connected to the second transmission channel; and
   said selection means is connected to the first and second transmission channels, selects one of the first and second transmission channels, and outputs data transmitted through the selected transmission channel.

19. A data transmission apparatus according to claim 14, wherein said first and second data check means execute at least one of: a CRC check, a parity check, a data size check, a time-out check, and an alignment error check.

* * * * *